United States Patent [19]

Phillippi

[11] 4,046,526
[45] Sept. 6, 1977

[54] BAG COLLECTOR FOR DIRT WITH SELECTIVE HALF-BAG CLEANING

[75] Inventor: John F. Phillippi, Mentor, Ohio

[73] Assignee: Aerodyne Development Corporation, Cleveland, Ohio

[21] Appl. No.: 648,093

[22] Filed: Jan. 12, 1976

[51] Int. Cl.$^2$ ............................................. B01D 46/04
[52] U.S. Cl. ............................................. 55/96; 55/288;
   55/302; 55/341 R; 55/368; 55/379; 55/381
[58] Field of Search .................... 55/96, 283, 284, 286,
   55/287, 288, 302, 341 R, 341 NT, 341 M, 341
   H, 341 MC, 341 PC, 341 HM, 368, 379, 381,
   430

[56] References Cited

U.S. PATENT DOCUMENTS

| | | | |
|---|---|---|---|
| 1,974,952 | 9/1934 | Eiben | 55/430 |
| 2,507,335 | 5/1950 | Donohue | 55/379 |
| 3,377,783 | 4/1968 | Young | 55/379 |
| 3,436,898 | 4/1969 | Kaess et al. | 55/341 R |
| 3,540,193 | 11/1970 | Pausch | 55/283 |
| 3,853,508 | 12/1974 | Gordon et al. | 55/341 NT |

*Primary Examiner*—Frank W. Lutter
*Assistant Examiner*—David L. Lacey
*Attorney, Agent, or Firm*—Baldwin, Egan, Walling & Fetzer

[57] ABSTRACT

A plurality of elongated tubular porous bags are arranged in a straight line side by side in a housing through which a dirty stream of gas is passed impinging on the outer surfaces of the bags and thus collecting dirt particles there. In the middle of each bag, extending from end to end thereof, is an impervious linear partition dividing the interior of each bag into two non-communicating half portions. To clean the collected dirt off the outer faces of the bags, means is provided for discharging a cleaning stream of gas into two adjacent selected half portions of two different bags under sufficient pressure to pass outwardly through the half portions and dislodge the dirt collected on the outer faces of those half portions, while the apparatus continues to collect dirt particles on the other bags including the other half-portions of the two bags currently being cleaned.

13 Claims, 8 Drawing Figures

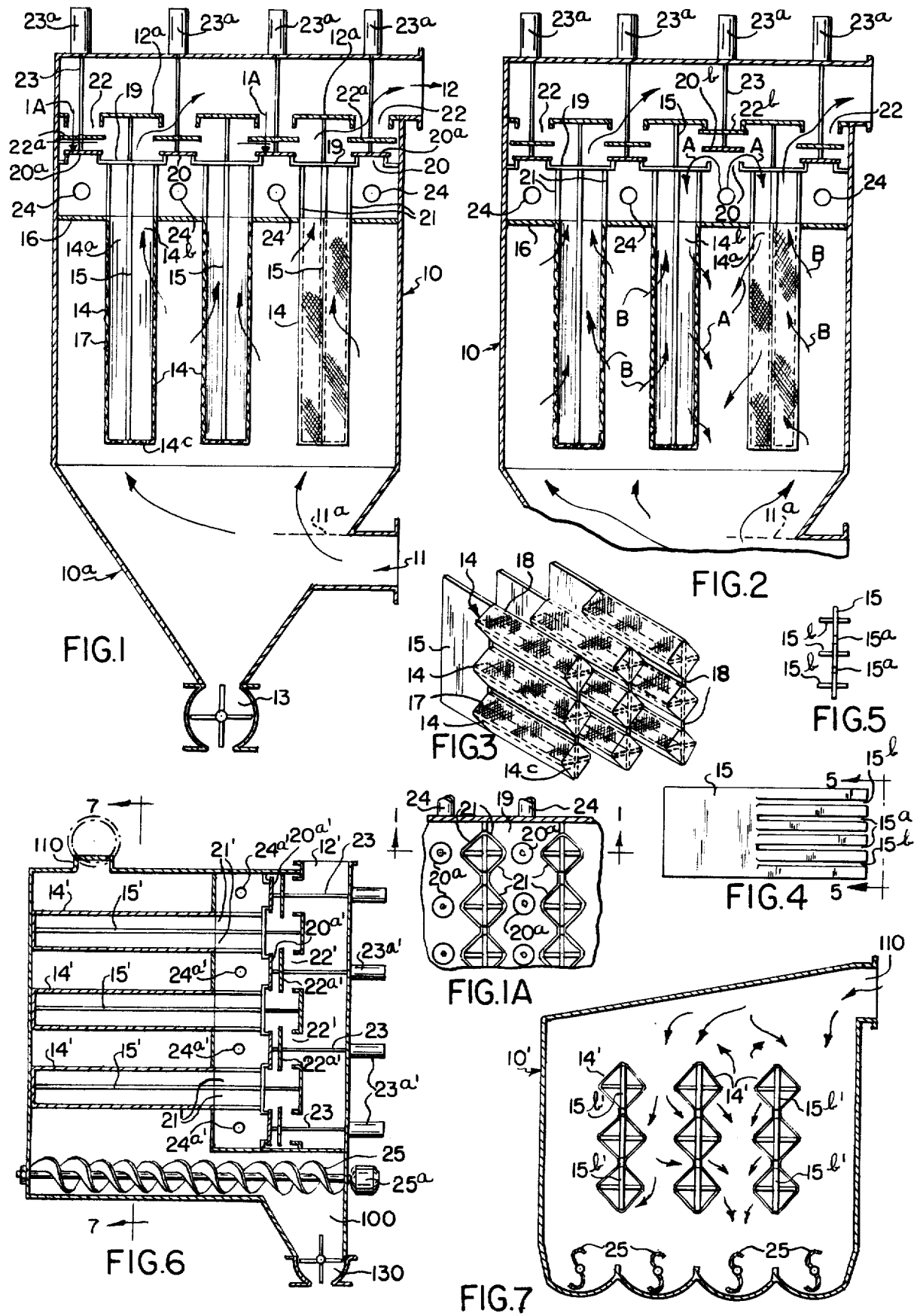

BAG COLLECTOR FOR DIRT WITH SELECTIVE HALF-BAG CLEANING

BACKGROUND OF THE INVENTION

It is quite customary in use of porous bag collectors for dust or dirt particles to suspend a plurality of bags in a housing in parallel relationship, to pass the dirty stream of gas through the housing to collect dirt on the outer surfaces of the bags which discharges endwise through the bag as a clean gas stream. It is also common in cleaning the dirt collected on the outside of such bags to pass a cleaning stream into the inside of said bags and then radially outward through the bags to dislodge the dirt collected there. At such times, some bags are being cleaned in this manner while other bags are still collecting dirt out of the dirty gas stream and some of the dislodged dirt from bags being cleaned is again caught on the outer surface of adjacent bags which are still operating in a dust collecting manner. It is an object of the present invention to avoid most of this difficulty.

The present invention is designed to obviate the above indicated difficulty by separating each of the bags into two half portions by means of an impervious partition extending throughout the length of the bags and then, after the dirt is collected on the outer surfaces of some of said bags, a cleaning stream of gas is introduced at one end of two of said adjacent bags into the two adjacent half portions thereof with sufficient force to dislodge the dirt on the outer surfaces of said half portions which dirt is dropped to the bottom of a hopper and later removed. At such times, the other half portions of the same two bags are still collecting dirt on the outer surfaces thereof in the usual manner but between the two half portions being cleaned, the air is substantially quiet or static and the dislodged dirt falls downwardly without being attracted to an adjacent surface of a bag in a dust collecting condition.

Other objects and advantages of the invention will be apparent from the accompanying specification and drawings and the essential features thereof will be set forth in the appended claims.

In the drawings,

FIG. 1 is a central sectional view through a row of bags within a suitable housing, the position of this section being shown by the line 1—1 of FIG. 1A;

FIG. 1A is a fragmental sectional view taken along the line 1A—1A of FIG. 1;

FIG. 2 is a view similar to FIG. 1 showing one of the valves open to admit a cleansing gas stream to adjacent half portions of two bags at the same time;

FIG. 3 is a sectional view illustrating one way of providing the bag structure with an imperforate partition extending endwise of each bag in approximately the center thereof;

FIG. 4 is a plan view, on a smaller scale, of one of the partitions of FIG. 3;

FIG. 5 is an end view of the structure of FIG. 4 seen from the right-hand end of that Figure;

FIG. 6 is a central sectional view through a device utilizing the same invention as FIGS. 1 and 2 except that FIG. 6 is turned at 90 degrees to FIG. 1 or FIG. 2; while FIG. 7 is a sectional view taken along the line 7—7 of FIG. 6.

FIGS. 1 and 2 show a bag housing 10 which is substantially imperforate except for an inlet for dirty gas at 11 and an exit for clean gas at 12, together with means at 13 to remove collected dirt from the housing.

Three elongated tubular porous bags 14 are each provided with a linear partition 15 in the middle of each bag normal to the straight line along which the three bags 14 lie and dividing the inside of each bag into two non-communicating half portions 14a and 14b running from the closed bottom 14c of each bag up to a tube sheet 16 which is herein designated as a limiting partition because the bags 14 are suspended from this tube sheet through suitable openings of the same cross section as the bags but otherwise imperforate so that the incoming dirty gas entering at 11 impinges on the outer surface of the bags 14 from the bottom thereof up to the limiting partition 16.

One way of forming the structure just disclosed with respect to the bags 14 and the partition 15 is shown in FIGS. 3, 4 and 5. The partition 15 is cut away by parallel slots 15a running from one end of the partition in parallel lines toward the other end for the distance corresponding to the length of the bags 14. Short cross partitions 15b are rigidly secured at right angles to the partition 15 in position to lie on the center line of each of the bags 14 when the same is assembled as shown in FIG. 3. Sheets of porous filter cloth 17 are sewn together along suitable properly spaced parallel lines 18, either using two sheets, one for each side of the partition 15 or one sheet passing up one side and down the other side. The filter cloth, so sewed together, is then pulled over the structure of FIG. 4 in the position shown in FIG. 3 and secured there, leaving the upper ends of the bags 14 open but closing the lower ends of the bags at 14c in any suitable manner.

A third partition 19 extends across the housing 10 spaced from and parallel to the limiting partition 16. The partition 19 is imperforate except for openings 20a where a vertical extension of the bag cross section passes through the partition 19. These valve openings 20 serve as means for closing off or admitting a cleaning gas stream to adjacent half portions of two different collector bags.

The cross section of each bag unit 14 is extended vertically between the limiting partition 16 and the third partition 19 by means of imperforate guiding partitions 21 which are best seen in FIGS. 1, 2 and 1A.

In this form of the invention, the cleaned gas stream is discharged through the duct 12 whch extends across all of the bags as seen in FIGS. 1 and 2. The bottom floor of this duct 12 is indicated at 12a and is parallel to and spaced above the third partition 19. This floor 12a is imperforate except for openings 22 which are here shown as concentric with and spaced from the previously described openings 20 in the partition 19. Valve opening and closing means is provided between the partitions 19 and 12a as follows. Concentric with a pair of related openings 20 and 22 is a common valve operating rod 23 to which are rigidly attached a circular valve plate 20a adapted to close the valve opening 20 and another valve plate 22a adapted to close the opening 22. These two valve plates are so positioned that when valve plate 20a is in closed position, then valve plate 22a is in open position as seen in FIG. 1. This position corresponds with the normal cleaning operation of an associated bag 14. During a cleaning operation, the rod 23 is operated, by solenoid 23a or other suitable apparatus, to the position shown at 20b and 22b in FIG. 2 which closes off the dirt collecting operation at the half portion 14a of one bag and the half portion 14b of an adjacent bag and permits the cleaning gas stream to enter from a suitable source through one of the ducts 24 causing the cleaning gas stream to enter from 24 into the space between partitions 16 and 19, and between linear partitions 15 to enter as shown by the arrows A in FIG. 2 to pass downward through the adjacent indicated half portions 14a and 14b so as to dislodge dirt collected on the outer surfaces of those half portions allowing the same to drop down relatively quietly into the bottom of the hopper portion 10a of the housing. Meanwhile, the other nonselected half portions of said bags are acting in a dust collecting manner as indicated by the arrows B in FIGS. 1 and 2, wherein the dirty gas stream is seen impinging on the outer surfaces of the bag half portions and passing upwardly between the guiding partitions 21 and out through the openings 22 through the open valve plates 22a.

The dirty gas stream enters the housing 10 and 11 which is an opening in the hopper bottom 10a. Preferably, as shown in broken lines, the upper wall of the inlet duct 11 may be extended inwardly sufficiently to provide a more even distribution of the dirty gas stream amongst the several bags collectors 14. This is shown at 11a in broken lines in FIGS. 1 and 2.

Means is provided for unloading collected dirt or dust at the bottom of the hopper 10a as indicated at 13, here shown as a rotary valve which permits the removal of the dirt particles without interfering with the flow within the housing 10.

The modification shown in FIGS. 6 and 7 is almost exactly like that described in connecton with FIGS. 1 and 5 (including FIG. 1A) except that the entire device is rotated 90° from one position to the other. All of the parts which are constructed the same and which perform the same function as already described are given the same reference characters with a prime suffix. The only differences are the introduction of the dirty gas stream at the top inlet 110 and the removal of the collected dirt at the bottom which is facilitated by a plurality of screw conveyors 25, each operated by a suitable motor 25a and carrying the material from left to right as viewed in FIG. 6 to a hopper 100 for removal by a rotary valve 130.

It should be understood that the operation of the solenoid 23a to actuate the valve rods 23 and move the position of the valve plates 20a and 22a might be individually controlled or might actuate all of the valve plates 20a in a given line, as seen in FIG. 1A, as desired by the operator.

What is claimed is:

1. A method of cleaning bag collectors of dirt particles wherein a plurality of elongated tubular porous bags are arranged in a bag housing with their longer dimensions parallel and in a straight line side by side with means for passing a dirty stream of gas simultaneously through said bags radially inwardly, thus collecting dirt on the outer faces of said bags, means for discharging the clean stream of gas at an open end of said bags, A substantially impervious linear partition in the middle of each bag normal to said straight line dividing the inside of each bag into two non-communicating half portions extending from end to end of each bag and beyond said open ends of said bags to said means for discharging said clean stream of gas; comprising selectively closing said clean gas discharging means of two adjacent half portions of two of said bags, and selectively passing a cleansing stream of gas into the interior of said selected two adjacent half portions under sufficient pressure to pass outwardly through said two adjacent half portions and dislodge the dirt collected on the outer faces of said two adjacent half portions, while continuing to collect dirt particles on the other half portions of said two bags whereby the space between said two selected half portions is relatively quiescent and said dislodged dirt falls downwardly.

2. The method of claim 1, wherein said bags are vertically oriented in said bag housing.

3. The method of claim 1, wherein said bags are horizontally oriented in said bag housing.

4. A bag collector for removing particles carried in a dirty stream of gas, comprising a housing, a plurality of elongated tubular porous filter bags mounted in said housing in a straight line side by side with their longer dimensions parallel, all of said bags closed at the same one end and open at the other end, a first limiting partition in said housing extending entirely across said housing at the open tops of said bags and defining a clean gas chamber on one side thereof and a dirty gas chamber on the other side, thus confining said dirty gas to impinge on the lower ends of said bags up to a zone near the tops of said bags, said first limiting partition having openings to which said open ends of said filter bags are attached, a second partition spaced from and parallel to said first limiting partition in said clean gas chamber and extending entirely across said housing and being imperforate except for first clean gas openings between each two adjacent bags in said line and openings opposite each open end of each bag, third guiding partitions extending in line with each bag parallel to the bag center line between said first limiting partition and said second partition, an inlet through said housing to introduce under pressure a stream of dirty gas into said dirty gas chamber of said housing outside of said bags, a discharge means for clean gas extending entirely across said housing and parallel and spaced from said second partition on the side thereof opposite said first limiting partition, said gas discharge means being imperforate except for second clean gas openings one opposite each said first clean gas openings, a substantially impervious linear fourth partition in the middle of each bag normal to said straight line of bags dividing the inside of each bag into two non-communicating half portions extending from end to end of each bag, said fourth partition extending beyond the open ends of each bag through said second partition and to said discharge means, a first valve means mounted in said housing for movement to close and open each of said second clean gas openings in communication between said discharge means and individual open ends of adjacent half portions of said bags, means for selectively opening and closing said first valve means, a duct for cleansing gas under pressure communicating between each two bags in said line and between said first limiting partition and said second partition, second valve means mounted in said housing for movement to close and open each of said first clean gas openings communicating between said duct for cleansing gas and said individual open ends of adjacent half portions of said bags, means for selectively opening and closing said second valve means when said first valve means is respectively closed and opened, and means for collecting dirt from said bags in the bottom of said housing, said partitions in said housing and said valves permitting clean air from the tops of adjacent half-bag portions to pass out said discharge means only when said first valve means is open and for causing said cleansing gas to pass into the open tops of adjacent half-bag portions only when said second valve means is open, whereby said first valve means may be closed and said second valve means may be opened in relation to a selected pair of two adjacent half portions of said bags to dislodge dirt particles on the outer surfaces of said two half portions to fall downwardly in relative quiescent state while other half portions of the same and other bags are collecting dirt particles.

5. A bag collector as defined in claim 4, wherein said bags are vertically mounted.

6. A bag collector as defined in claim 4, wherein said bags are horizontally mounted.

7. A bag collector as defined in claim 4, wherein said discharge means for clean gas comprises a conduit extending across a plurality of the open ends of said bags and spaced therefrom.

8. A bag collector as defined in claim 7, wherein said first and second valve means are located between said conduit and said open ends of said bags.

9. A bag collector as defined in claim 8, wherein said ducts for delivering a cleansing gas are provided between said first and second valve means and said open ends of said bags, said linear partition in the middle of said bags extends uninterrupted past said first and second valve means to said conduit, said first valve means communicating with said conduit, said second partition extending across said open ends of said bags between said limiting partition and said conduit, said second valve means being located at a common level just above said second partition, and said guiding partitions enclosing said bag openings and extending from said limiting partition to said second partition.

10. A bag collector as defined in claim 9, wherein said first valve means opens toward said bags and said second valve means open away from said bags.

11. A bag collector as defined in claim 10, including a single operator having said first and second valve means connected therewith so that said first valve means opens and closes respectively as said second valve means closes and opens.

12. A bag collector as defined in claim 4, wherein each of said bags has a cross partition in the inside supporting the filter cloth of said bag.

13. A bag collector as defined in claim 4, wherein said impervious linear partition dividing bag is common to a plurality of bags, at each bag location on said partition a cross-partition is rigidly secured thereto at a right angle, said cross-partition being the length of a cross-section of said bag, and two sheets of bag cloth of a length to form said plurality of bags stitched together along parallel lines spaced to provide between them the cloth necessary to extend from said linear partition out around one of said cross-partitions and back to said impervious linear partition, whereby said two sheets so stitched together may be slipped endwise over said linear partition and said cross-partitions to form a plurality of bags oriented longitudinally in a line.

* * * * *